(12) United States Patent
Birkeland

(10) Patent No.: US 9,341,041 B2
(45) Date of Patent: May 17, 2016

(54) CUTTING DEVICE, SAFETY VALVE, METHOD AND USES FOR SEVERING A PIPE-STRING-RELATED OBJECT IN A SAFETY VALVE FOR A WELL

(75) Inventor: Petter Birkeland, Tananger (NO)

(73) Assignee: Smart Installations AS, Tananger (NO)

( * ) Notice: Subject to any disclaimer, the term of this patent is extended or adjusted under 35 U.S.C. 154(b) by 132 days.

(21) Appl. No.: 14/115,303

(22) PCT Filed: May 16, 2012

(86) PCT No.: PCT/NO2012/050089
§ 371 (c)(1),
(2), (4) Date: Dec. 16, 2013

(87) PCT Pub. No.: WO2012/158044
PCT Pub. Date: Nov. 22, 2012

(65) Prior Publication Data
US 2014/0332225 A1    Nov. 13, 2014

(30) Foreign Application Priority Data

May 16, 2011    (NO) .................................... 20110729

(51) Int. Cl.
*B23D 15/14*    (2006.01)
*E21B 33/06*    (2006.01)
(Continued)

(52) U.S. Cl.
CPC .............. *E21B 33/063* (2013.01); *B23D 15/02* (2013.01); *B23D 15/14* (2013.01); *B23D 21/00* (2013.01); *E21B 29/08* (2013.01)

(58) Field of Classification Search
CPC .......... E21B 29/08; E21B 33/06; B23D 21/00
USPC .................. 166/55, 55.2, 55.3, 363, 361, 297
See application file for complete search history.

(56) References Cited

U.S. PATENT DOCUMENTS 1,875,673 A    9/1932   Stockstill
1,949,672 A    3/1934   Barrier
(Continued)

FOREIGN PATENT DOCUMENTS

DE     41 14 355 A1    11/1992
FR     2667533         4/1992
WO     9203265         3/1992

OTHER PUBLICATIONS

International Search Report for parent application PCT/NO2012/050089, having a mailing date of Sep. 20, 2012.
(Continued)

*Primary Examiner* — Matthew R Buck
*Assistant Examiner* — Patrick Lambe
(74) *Attorney, Agent, or Firm* — Andrus Intellectual Property Law, LLP

(57) ABSTRACT

A cutting device, safety valve and method are for severing an object in the safety valve for a well, wherein the cutting device is structured for incorporation in the safety valve. The cutting device and the safety valve comprise a housing having a through bore structured for passing the object therethrough. The cutting device/safety valve comprises at least one induction coil device disposed in the housing, and around at least a portion of the bore of the housing.
The induction coil device is directed inwards in the direction of the bore and is structured for optional, cutting-promoting heating, hence thermal structural weakening, of the object when located vis-à-vis the induction coil device.
The induction coil device is structured in a manner allowing it to be connected to at least one electric power source for supply of electric power for heating.
The housing comprises a heat-insulating portion disposed between the induction coil device and the housing.

14 Claims, 2 Drawing Sheets

(51) Int. Cl.
*B23D 15/02* (2006.01)
*B23D 21/00* (2006.01)
*E21B 29/08* (2006.01)

(56) References Cited

U.S. PATENT DOCUMENTS

| | | |
|---|---|---|
| 3,068,336 A | 12/1962 | Tamm |
| 3,561,526 A | 2/1971 | Williams et al. |
| 3,590,920 A | 7/1971 | Orund et al. |
| 3,736,982 A * | 6/1973 | Vujasinovic ................. 166/55 |
| 3,766,979 A | 10/1973 | Petrick |
| 4,313,496 A | 2/1982 | Childs et al. |
| 4,540,046 A | 9/1985 | Granger et al. |
| 4,646,825 A | 3/1987 | Van Winkle |
| 4,923,008 A | 5/1990 | Wachowicz et al. |
| 4,987,956 A | 1/1991 | Hansen et al. |
| 5,188,177 A * | 2/1993 | Curry ............................ 166/297 |
| 5,224,638 A | 7/1993 | Nolan et al. |
| 5,400,857 A | 3/1995 | Whitby et al. |
| 5,407,172 A | 4/1995 | Young et al. |
| 6,078,031 A | 6/2000 | Bliault et al. |
| 6,142,707 A | 11/2000 | Bass et al. |
| 6,617,556 B1 | 9/2003 | Wedel |
| 2006/0231549 A1 | 10/2006 | Kisner et al. |

OTHER PUBLICATIONS

Written Opinion for parent application PCT/NO2012/050089, having a mailing date of Sep. 20, 2012.
European Search Report for EP12785067 dated Sep. 18, 2015.

* cited by examiner

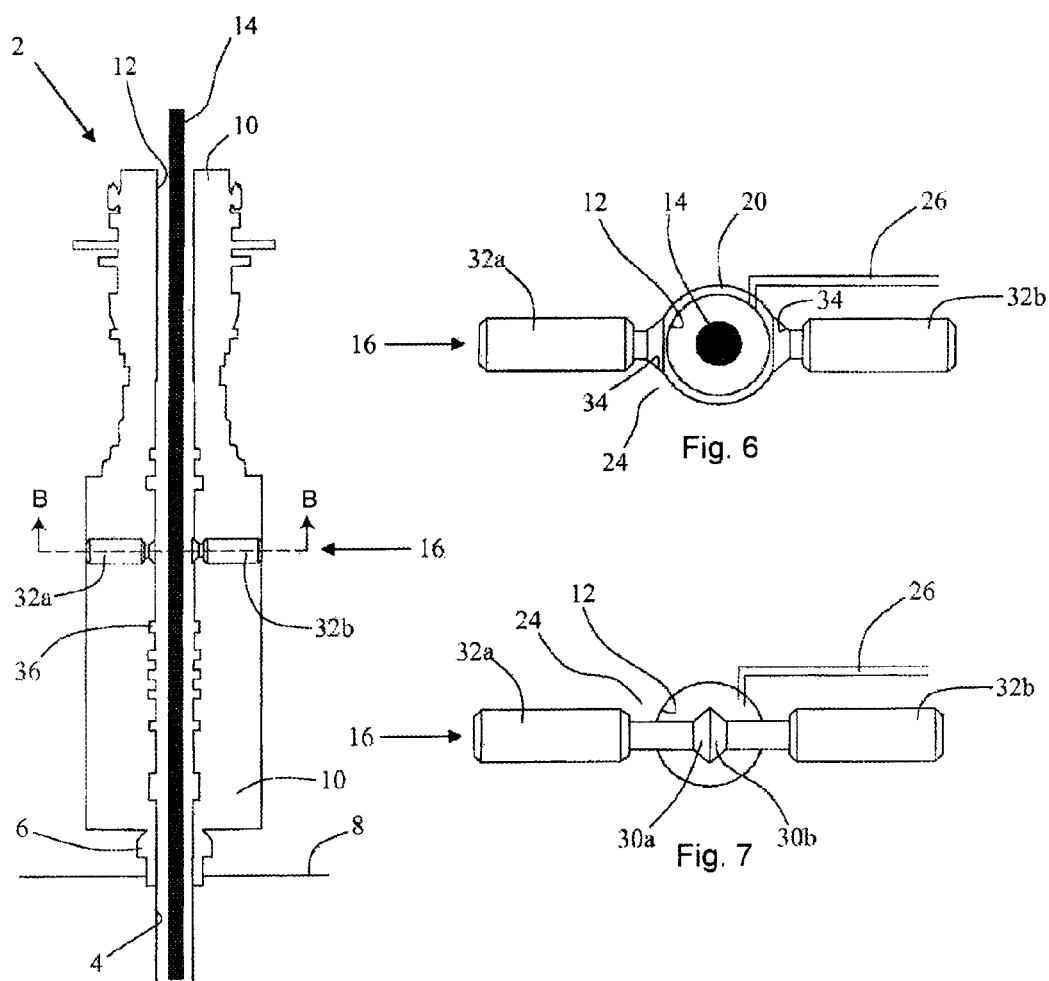

CUTTING DEVICE, SAFETY VALVE, METHOD AND USES FOR SEVERING A PIPE-STRING-RELATED OBJECT IN A SAFETY VALVE FOR A WELL

CROSS-REFERENCE TO RELATED APPLICATIONS

This application is the U.S. national stage application of International Application No. PCT/NO2012/050089, filed May 16, 2012, which International application was published on Nov. 22, 2012 as International Publication No. WO 2012/158044 A1 in the English language and which application is incorporated herein by reference. The International application claims priority of Norwegian Patent Application No. 20110729, filed May 16, 2011, which application is incorporated herein by reference.

FIELD OF THE INVENTION

The invention concerns a cutting device for a safety valve, a safety valve for a well, a method for severing a pipe-string-related object in a safety valve and also three uses for severing a pipe-string-related object located in a through bore in a safety valve for a well.

Such a safety valve may be comprised of a blowout preventer ("BOP"), for example a blowout preventer for drilling a well. The safety valve may also be comprised of a Christmas tree for a completed well, for example a production well, injection well, geo-thermal well or a water well. In this context, the well may be comprised of an under-water well, for example a subsea well, or a surface well.

BACKGROUND OF THE INVENTION

The background of the invention relates to the so-called Macondo-blowout, which was initiated in April, 2010. The blowout originated from a BP-operated oil well located in ca. 1500 meter deep water in the Gulf of Mexico. Following a preceding explosion on a floating drilling rig ("Deepwater Horizon") connected to the oil well, attempts were made to sever an associated oil pipe extending through a blowout preventer placed on the seabed above the oil well. High pressure from flowing oil in the oil pipe caused the pipe to bend and displace to a non-centric position within the through bore (pipe interior) of the blowout preventer. Among other things, this blowout preventer was provided with a so-called blind shear ram designed for severing a steel pipe and also for subsequent sealing of the bore through the blowout preventer. The shear ram, however, was not designed for severing a non-centric pipe in the blowout preventer. This resulted in incomplete severing and sealing of the bore of the blowout preventer, whereby oil at high pressure leaked out for a long time thereafter.

PRIOR ART AND DISADVANTAGES THEREOF

There are a number of publications, including patent publications, relating to various aspects of well safety valves and cutting devices associated therewith.

The closest prior art appears to be represented by the following patent publications:
U.S. Pat. No. 5,407,172 A; and
DE 4,114,355 A1.

U.S. Pat. No. 5,407,172 A concerns a piston-type blowout preventer comprising a location device for pistons associated with corresponding closing rams in the blowout preventer. The location device is provided with electromagnetic induction instrumentation for reporting information about the positions of the pistons within the blowout preventer.

DE 4,114,355 A1 concerns a method and a cutting device for killing burning blowouts in land-based petroleum wells. The method involves digging a shaft down into the underground and onward to the petroleum-producing pipes of the well, thereby gaining free access to the well pipes. A blowout preventer having piston rams is then placed around the well pipes so as to clamp these together until the pipes seal against each other. In order to prevent the well pipes from cracking during the compression, the pipes may possibly be heated inductively in the compression region of the pipes. It is very essential that the pipes are not severed in context of said compression, insofar as such severing will allow the blowout to be conducted into said shaft and up to the surface. Then a cutting device, which comprises a drill, is attached in a sealing manner to the outside of the outermost well pipe, and below said compression region, whereupon the drill is activated and drills into the well pipes. Finally, a well kill fluid is pumped down into the well to stop the blowout. The method is carried out via remote control.

The following patent publications are also mentioned as examples of cutting devices for such well safety valves:
U.S. Pat. No. 1,875,673 A;
U.S. Pat. No. 1,949,672 A;
U.S. Pat. No. 3,561,526 A;
U.S. Pat. No. 3,590,920 A;
U.S. Pat. No. 3,736,982 A;
U.S. Pat. No. 3,766,979 A;
U.S. Pat. No. 4,313,496 A;
U.S. Pat. No. 4,540,046 A;
U.S. Pat. No. 4,646,825 A;
U.S. Pat. No. 4,923,008 A;
U.S. Pat. No. 4,987,956 A; and
U.S. Pat. No. 5,400,857 A (corresponds to NO 310840 B1).

Common to all of these publications is that they concern cutting devices based on mechanical cutting principles, the cutting devices of which are generally structured for cutting of well pipes.

Pipe strings used in wells may also comprise various objects being far more massively structured than that of ordinary well pipes incorporated in such pipe strings. For example, said pipe-string-related objects may comprise various tools and equipment connected to such pipe strings. Moreover, pipe strings comprising pipes having a particularly large material thickness, for example so-called drill collars used in bottomhole assemblies (BHA) for drill strings, may be used. Upon using known cutting devices for well safety valves, it may prove far more cumbersome and even impossible, in an emergency, to sever such tools, equipment and thickened well pipes than that of severing ordinary well pipes.

OBJECTS OF THE INVENTION

The principal object of the invention is to remedy or reduce at least one disadvantage of the prior art, or at least to provide a useful alternative to the prior art.

Another object of the invention is to be able to sever, in a well safety valve, pipe-string-related objects being more massively structured than that of ordinary well pipes.

A further object of the invention is to be able to sever, in a well safety valve, pipe-string-related objects being non-centrically positioned within the through bore of the safety valve.
General Description of the Manner in which the Objects are Achieved The objects are achieved by virtue of features disclosed in the following description and in the subsequent claims.

According to a first aspect of the invention, a cutting device is provided for severing a pipe-string-related object in a safety valve for a well, wherein the cutting device is structured for incorporation in the safety valve, and wherein the cutting device comprises a housing having a through bore structured for passing said object therethrough. The distinctive characteristic of the cutting device is that it comprises at least one induction coil device disposed in said housing, and around at least a portion of the bore of the housing;

wherein said induction coil device is directed inwards in the direction of the bore;

wherein the induction coil device is structured for optional, cutting-promoting heating, hence thermal structural weakening, of the object when located vis-à-vis the induction coil device;

wherein the induction coil device is structured in a manner allowing it to be connected to at least one electric power source for supply of electric power for said heating; and wherein the housing comprises a heat-insulating portion disposed between the induction coil device and the housing.

In context of a hydrocarbon well, heating by means of such an induction coil device may involve danger of explosion and/or danger of fire. This, however, may only occur if air/oxygen is supplied to the cutting device in the course of heating. Such a situation will not exist under water or in the event that the particular well is not producing hydrocarbons.

If said course of heating is carried out above water, and in context of a hydrocarbon well, danger of explosion and/or danger of fire may be avoided by enclosing, or enveloping, the present cutting device in a non-flammable means which ensures that air/oxygen is not supplied in the course of heating. For example, such a non-flammable means may be comprised of an air-tight receptacle enclosing the cutting device and being filled with e.g. water or a non-flammable gas, for example nitrogen, carbon dioxide and/or an inert gas. When required, it is even conceivable to envelope the cutting device in such a gas being supplied from a suitable gas supply arrangement associated with the cutting device.

As mentioned, said pipe-string-related object in the safety valve may comprise a relatively massively structured object, for example various tools and equipment connected to a pipe string extending through a through bore in said housing. As such, the object may comprise a well tool, for example a measuring instrument, a well valve, an actuator, a pumping device or similar. Often times, but not always, such objects have a tubular design.

The object may also be comprised of a typical tubular object. As such, the object may comprise an ordinary well pipe per se, for example a casing, a production tubing, an injection pipe, a drill pipe, a drill collar or similar.

For optional heating of said object, the at least one induction coil device may also be structured for connection to an electric power supply network on an associated installation, for example on a platform or a vessel, possibly on a remote host facility onshore or offshore. As an alternative or addition, the induction coil device may be structured for connection to one or more batteries, for example a battery pack, for supply of electric power to the induction coil device.

Further, the induction coil device may comprise one or more induction coil devices disposed, for example incorporated in a cavity, in said housing, and around a longitudinal portion and/or circumferential portion of the bore of the housing. For example, two opposite induction coil devices incorporated each in a respective opposite cavity in the housing may thus be used. In this context, a heat-insulating portion, for example an asbestos-containing and/or ceramic-containing portion, may be disposed between the induction coil devices and the surrounding material (goods) of the housing. By so doing, the induction coil devices may possibly heat and melt said object until being severed, but without the surrounding material of the housing being weakened or melting at the same time.

According to a first embodiment, the cutting device may also comprise at leas one pipe ram disposed in said housing, and below the induction coil device;

wherein said pipe ram is structured for optional activation and enclosing of the object when located vis-à-vis the pipe ram; and wherein the pipe ram is structured in a manner allowing it to be connected to at least one power source for supply of activation power for said activation and enclosing.

By so doing, the pipe ram may be activated and caused to enclose a lower part of the object upon having severed, by means of the induction coil device, an overlying portion thereof from a lower part of the object.

According to an alternative, second embodiment, the cutting device may also comprise at least one shear ram disposed in said housing and in vicinity of the induction coil device for cooperation therewith;

wherein said shear ram is structured for optional activation and mechanical cutting of the object when located vis-à-vis the shear ram: and wherein the shear ram is structured in a manner allowing it to be connected to at least one power source for supply of activation power for said activation and mechanical cutting.

By disposing at least one shear ram in vicinity of the induction coil device and also activating said shear ram upon having heated the object sufficiently, by means of the induction coil device, to weaken the object structurally, the shear ram and the induction coil device will cooperate and, hence, will contribute to a faster severing of the object than that of pure inductive severing of the object. For this reason, this second embodiment of the cutting device is also well suited for severing relatively massive objects in the bore of the housing.

In context of this second embodiment, the at least one shear ram may be disposed below and/or above the induction coil device.

According to this second embodiment, the cutting device may also comprise at least one pipe ram disposed in said housing, and below the shear ram;

wherein said pipe ram is structured for optional activation and enclosing of the object when located vis-à-vis the pipe ram; and wherein the pipe ram is structured in a manner allowing it to be connected to at least one power source for supply of activation power for said activation and enclosing.

By so doing, the pipe ram may be activated and caused to enclose a lower part of the object upon having severed, by means of the induction coil device and possibly also said shear ram, an overlying portion thereof from a lower part of the object.

Further, said induction coil device may be structured so as to be radially movable relative to said bore. By so doing, the distance between the induction coil device and the object may be adjusted and, hence, may be adapted to the particular object in the bore. In this context, the induction coil device may be connected to a suitable moving device, for example a suitable actuator, a hydraulic piston-and-cylinder arrangement or similar, which is connected to or incorporated in the housing. Such an adjustment possibility renders possible to position the induction coil device at an optimum distance from the object, thereby rendering possible to carry out the most efficient and fast heating of the object when required.

Yet further, the at least one induction coil device may also be structured so as to be replaceable, thereby allowing the induction coil device to be readily removed from the housing for repair or replacement. As such, the induction coil device may be releasably connected to the housing and possibly may be released and withdrawn from the housing, for example from the outside of the housing.

The cutting device may also be formed as at least one module structured for incorporation in said safety valve. By so doing, one module may be readily replaced with a corresponding module, if desirable or required.

According to a second aspect of the invention, a safety valve for a well is provided, wherein the safety valve is structured for severing a pipe-string-related object in the safety valve, and wherein the safety valve comprises a housing having a through bore structured for passing said object therethrough. The distinctive characteristic of the safety valve is that it comprises at least one induction coil device disposed in said housing, and around at least a portion of the bore of the housing;
    wherein said induction coil device is directed inwards in the direction of the bore;
    wherein the induction coil device is structured for optional, cutting-promoting heating, hence thermal structural weakening, of the object when located vis-à-vis the induction coil device;
    wherein the induction coil device is connected to least one electric power source for supply of electric power for said heating; and
    wherein the housing comprises a heat-insulating portion disposed between the induction coil device and the housing.

In context of a hydrocarbon well, heating by means of such an induction coil device may, as mentioned, involve danger of explosion and/or danger of fire. This, however, may only occur if air/oxygen is supplied to the cutting device in the course of heating. Such a situation will not exist under water or in the event that the particular well is not producing hydrocarbons.

If said course of heating is carried out above water, and in context of a hydrocarbon well, danger of explosion and/or danger of fire may be avoided by enclosing, or enveloping, the present cutting device in a non-flammable means which ensures that air/oxygen is not supplied in the course of heating. For example, such a non-flammable means may be comprised of an air-tight receptacle enclosing at least the particular portion of the safety valve and being filled with e.g. water or a non-flammable gas, for example nitrogen, carbon dioxide and/or an inert gas. When required, it is even conceivable to envelope the safety valve, or the particular portion thereof, in such a gas being supplied from a suitable gas supply arrangement associated with the safety valve.

Furthermore, all comments regarding relevant features of the cutting device according to the first aspect of the invention also apply to the safety valve according to this second aspect of the invention.

According to a first embodiment of the safety valve, it may also comprise at least one pipe ram disposed in said housing, and below the induction coil device;
    wherein said pipe ram is structured for optional activation and enclosing of the object when located vis-à-vis the pipe ram; and
    wherein the pipe ram is connected to at least one power source for supply of activation power for said activation and enclosing.

By so doing, the pipe ram may be activated and caused to enclose a lower part of the object upon having severed, by means of the induction coil device, an overlying portion thereof from a lower part of the object.

According to an alternative, second embodiment of the safety valve, it may also comprise at least one shear ram disposed in said housing and in vicinity of the induction coil device for cooperation therewith;
    wherein said shear ram is structured for optional activation and mechanical cutting of the object when located vis-à-vis the shear ram; and
    wherein the shear ram is connected to at least one power source for supply of activation power for said activation and mechanical cutting.

By disposing at least one shear ram in vicinity of the induction coil device and also activating said shear ram upon having heated the object sufficiently, by means of the induction coil device, to weaken the object structurally, the shear ram and the induction coil device will cooperate and, hence, will contribute to a faster severing of the object than that of pure inductive severing of the object. For this reason, this second embodiment of the cutting device is also well suited for severing relatively massive objects in the bore of the housing.

In context of this second embodiment of the safety valve, the at least one shear ram may be disposed below and/or above the induction coil device.

According to this second embodiment of the safety valve, it may also comprise at least one pipe ram disposed in said housing, and below the shear ram;
    wherein said pipe ram is structured for optional activation and enclosing of the object when located vis-à-vis the pipe ram; and
    wherein the pipe ram is connected to a power source for supply of activation power for said activation and enclosing.

By so doing, the pipe ram may be activated and caused to enclose a lower part of the object upon having severed, by means of the induction coil device and possibly also said shear ram, an overlying portion thereof from a lower part of the object.

Moreover, said power source for the she ram and/or the pipe ram may comprise at least one hydraulic power source, for example a hydraulic power pack.

Further, the induction coil device may be structured so as to be radially movable relative to said bore. By so doing, the distance between the induction coil device and the object may be adjusted and, hence, may be adapted to the particular object in the bore. In this context, the induction coil device may be connected to a suitable moving device, for example a suitable actuator, a hydraulic piston-and-cylinder arrangement or similar, which is connected to or incorporated in the housing. Such an adjustment possibility renders possible to position the induction coil device at an optimum distance from the object, thereby rendering possible to carry out the most efficient and fast heating of the object when required.

Yet further, the at least one induction coil device may also be structured so as to be replaceable, thereby allowing the induction coil device to be readily removed from the housing for repair or replacement. As such, the induction coil device may be releasably connected to the housing and possibly may be released and withdrawn from the housing, for example from the outside of the housing.

Furthermore, at east said induction coil device may be incorporated as a module in the safety valve. By so doing, one module may be readily replaced with a corresponding module, if desirable or required.

The safety valve may also comprise at least one shut-off valve for said bore, wherein the shut-off valve is disposed above the induction coil device. By so doing, the bore of the safety valve may be shut off upon severing and withdrawing an upper part of the object. For example, said shut-off valve may comprise a ball valve.

Further, the object may be comprised of a tubular object, for example a well pipe or a well tool.

Yet further, the safety valve may be comprised of a blowout preventer ("BOP"), or of a Christmas tree.

According to a third aspect of the invention, a method is provided for severing a pipe-string-related object in a safety valve for a well, wherein the safety valve comprises a housing having a through bore structured for passing the object therethrough. The distinctive characteristic of the method is that it comprises the following steps:

(A) disposing at least one induction coil device in said housing, and around at least a portion of the bore of the housing, the housing also comprising a heat-insulating portion located between the induction coil device and the housing;
(B) structuring the induction coil device for optional, cutting-promoting heating, hence thermal structural weakening, of the object;
(C) connecting the induction coil device to at least one electric power source for supply of electric power for said heating; and
(D) for severing the object when located in the safety valve vis-à-vis the induction coil device, activating the induction coil device and heating the object until at least one of the following two conditions exist:
  the object melts and is separated into an upper part and a lower part; and
  the object is sufficiently weakened thermally and structurally to allow at least one shear ram in the safety valve to sever the object and separate it into an upper part and a lower part.

Further, the present method may also comprise the following steps:
(E) withdrawing the upper part of the object from the safety valve; and
(F) then shutting off the safety valve by means of at least one shut-off valve disposed above the induction coil device in the safety valve.

All comments from the above-mentioned cutting device and safety valve according to the first and second aspects of the invention also apply to the present method.

Further, and according to a fourth aspect of the invention, a use of a cutting device according to the first aspect of the invention is provided for severing a pipe-string-related object in a safety valve for a well.

Yet further, and according to a fifth aspect of the invention, a use of a safety valve according to the second aspect of the invention is provided for severing a pipe-string-related object in the safety valve.

Finally, and according to a sixth aspect of the invention, a use of a method according to the third aspect of the invention is provided for severing a pipe-string-related object in a safety valve for a well.

SHORT MENTIONING OF FIGURES OF THE EXEMPLARY EMBODIMENT

Hereinafter, a non-limiting exemplary embodiment of a safety valve for a well will be shown, wherein the safety valve is formed according to the second aspect of the invention. This well safety valve comprises a cutting device according to the first aspect of the invention. This exemplary embodiment describes a preferred embodiment depicted in the accompanying drawings, where:

FIG. 1 shows a very schematic front elevation and vertical section through a safety valve according to the invention, wherein the figure shows a well pipe disposed in a through bore in the safety valve, wherein the figure also shows (with a dashed line) a section window of a cutting device, which is shown in larger scale in FIGS. 2-4, and wherein the cutting device is provided with an induction coil device (not shown) and a shear ram with opposite cutting knives (not shown);

FIG. 5 shows the safety valve according to FIG. 1, but wherein FIG. 5 instead shows (with a dashed line) a horizontal section line B-B through the cutting device;

Figure 1:
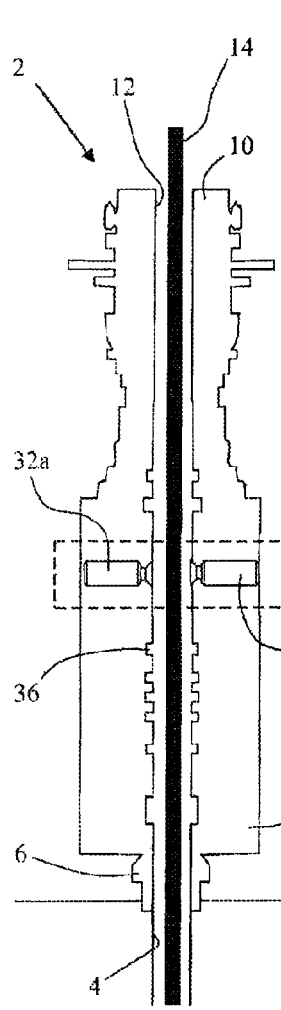

FIG. 6 shows, in larger scale, the cutting device as viewed along the above-mentioned horizontal section line B-B, wherein the cutting device is shown in a deactivated state before severing of said well pipe; and FIG. 7 shows, also in larger scale, the cutting device as viewed along the above-mentioned horizontal section line B-B, but wherein the cutting device now is shown upon having been activated, and upon having conducted the opposite cutting knives of the shear ram toward each other so as to sever the well pipe.

As mentioned, the figures are very schematic and only show details and equipment being essential to the understanding of the invention. Further, the figures are much distorted with respect to the relative dimensions of details and components shown in the figures. The figures are also very simplified with respect to the shape and richness of detail of such details and components. Hereinafter, equal, equivalent or corresponding details in the figures will be denoted substantially with the same reference numerals.

SPECIAL DESCRIPTION OF THE EXEMPLARY EMBODIMENT

FIG. 1 shows a vertical section through a safety valve according to the invention. In this embodiment, the safety valve is comprised of a blowout preventer 2, i.e. a so-called "BOP", for a subsea well 4. The blowout preventer 2 is mounted on top of a wellhead 6 placed on a seabed 8. Further, the blowout preventer 2 is connected to, and is controlled from, an installation (not shown) on the surface (not shown). The blowout preventer 2 receives control signals, hydraulic power and electric power from said installation.

The blowout preventer 2 comprises a massive housing 10 having a through bore 12 connected to the well 4. Yet further, FIG. 1 shows a well pipe 14, for example a drill string or a production tubing, conducted through the bore 12 in the housing 10 of the blowout preventer 2. In addition, the blowout preventer 2 comprises a cutting device 16 according to the invention. In this embodiment, the cutting device 16 is incorporated as a module 18 in the blowout preventer 2, the module 18 being shown only as a dashed section window in FIG. 1. This exemplary embodiment is meant to illustrate the manner in which the well pipe 14 may be severed both quickly and efficiently by means of the cutting device 16 in the blowout preventer 2.

Accordingly, the cutting device 16 comprises an induction coil device 20 disposed in a peripheral groove 22 in an annular area 24 of the housing 10, wherein the area 24 is located around the bore 12. This annular area 24 of the housing 10 also comprises a heat-insulating portion (not shown) formed from a heat-resistant material, for example asbestos or ceramics. Further, the groove 22 and the induction coil device 20 are directed inwards in the direction of the bore 12. For supply and control of electric power when required, the induction coil device 20 is connected to electric wires 26 conducted through the wall of the housing 10, the wires of which are connected, via a suitable cable (not shown), to said installation. As an alternative or addition, the electric power supply may comprise a battery pack (not shown) disposed on, or in vicinity of, the blowout preventer 2. Yet further, the induction coil device 20 is structured for optional, cutting-promoting heating, hence thermal structural weakening, of (in this case) the well pipe 10 when located vis-à-vis the induction coil device 20.

Figure 2:
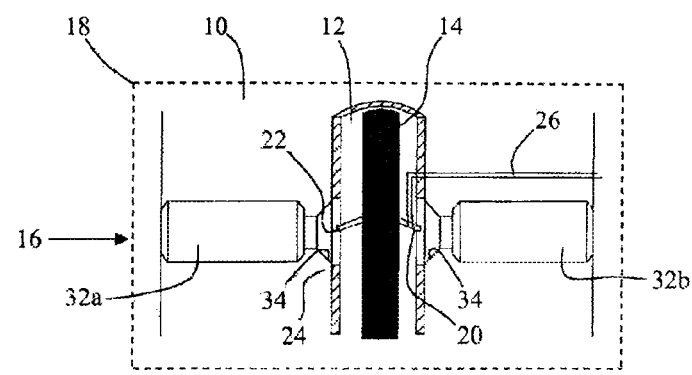
FIG. 2 shows the induction coil device of the cutting device upon having been activated and in the process of heating the well pipe.
Figure 3:
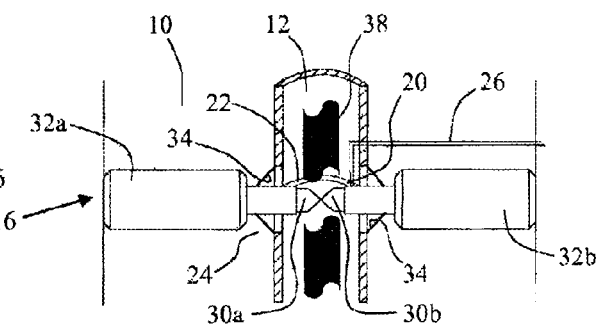
FIG. 3 shows the following step of the severing operation, wherein the shear ram of the cutting device also has been activated and has severed the well pipe by means of its two opposite cutting knives.
Figure 4:
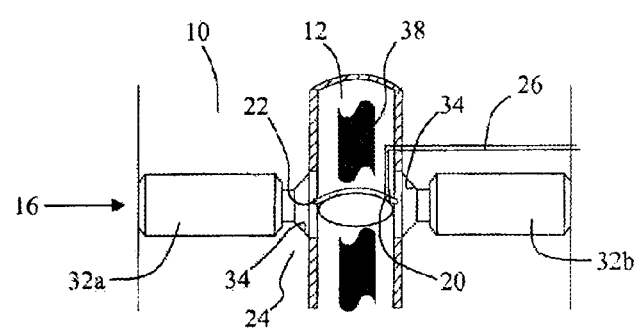
FIG. 4 shows the last step of the severing operation, wherein the induction coil device and the shear ram of the cutting device have been deactivated, and each of said cutting knives has been withdrawn into a respective cylinder housing in the housing (material goods) of the safety valve.

In this embodiment, the cutting device 16 also comprises a shear ram 28 disposed immediately below the induction coil device 20. The shear ram 28 comprises two opposite cutting knives 30a and 30b disposed each in a radially movable manner in a respective opposite cylinder housing 32a and 32b in the massive housing 10 (material goods) of the blowout preventer 2. As shown in FIGS. 2-4, the shear ram 28 is disposed in immediate vicinity of the induction coil device 20, thereby allowing it to cooperate with the induction coil device 20 during severing of the well pipe 14. Each cutting knife 30a, 30b is connected to a hydraulic piston-and-cylinder arrangement (not shown) disposed in each cylinder housing 32a, 32b. For control and supply of hydraulic power when required, and via suitable hydraulic lines (not shown), each piston-and-cylinder arrangement is connected to said installation. As an alternative or addition, the hydraulic power supply may comprise at least one hydraulic power supply unit/-pack (not shown) disposed on, or in vicinity of, the blowout preventer 2. Yet further, the shear ram 28 is structured for optional activation and mechanical cutting of the well pipe 10 when located vis-à-vis the shear ram 28 which, accordingly, is placed in immediate vicinity of the induction coil device 20. In inactive position, each of the opposite cutting knives 30a, 30b of the shear ram 28 are disposed within a respective recess 34 in the wall of the housing 10 surrounding the bore 12 in the blowout preventer 2, as shown in FIGS. 1, 2, 4 and 6. In active position, however, the cutting knives 30a, 30b are pushed out from their recesses 34 and are disposed with their knife blades and knife edges toward each other at the centre of the bore 12, as shown in FIGS. 3 and 7. In this embodiment, the rectilinear knife blades of the cutting knives 30a, 30b have a width exceeding the outer diameter of the well pipe 14 (cf. FIG. 7), whereby the cutting knives 30a, 30b may sever the complete well pipe 14 when required. Each cutting knife 30a, 30b also has a relatively pointy and V-shaped knife edge aligned, in the horizontal plane, with the opposite knife edge, as shown in FIG. 3. Moreover, other knife blade configurations and/or knife edge configurations may be used. In this respect, there are many examples to be found from known cutting devices for well safety valves; cf. the above-mentioned patent publications. Further, opposite cutting knives having knife blades formed in a complementary manner with respect to each other may be used, for example. Opposite cutting knives having knife blades formed in a non-complementary manner with respect to each other may also be used, for example V-shaped knife blades directed toward each other. Further, and as an addition or alternative, opposite cutting knives displaced parallel to each other may be used, hence cutting/clipping off the particular pipe-string-related object, for example the well pipe 14.

In this embodiment, the blowout preventer 2 also comprises several pipe rams 36 disposed in the massive housing 10, and below the shear ram 28. These pipe rams 36 are structured for optional activation and enclosing of the well pipe 14 when located vis-à-vis the pipe rams 36. Also these pipe rams 36 are connected, via suitable hydraulic lines (not shown), to said installation and a possible hydraulic power supply unit/-pack (not shown) on/at the blowout preventer 2 for control and supply of hydraulic power when required.

The blowout preventer 2 also comprises at least one shut-off valve (not shown), for example a ball valve, for the bore 12 in the massive housing 10. Said shut-off valve is disposed above the cutting device 16, thereby allowing the bore 12 to be shut off upon severing and withdrawing an upper part 38 of the well pipe 14, whereas a lower part 40 of the well pipe 14 will be located below the cutting device 16.

Hereinafter, severing the well pipe 14 by means of the present cutting device 16 will be described in further detail.

When severing the well pipe 14 by means of this cutting device 16 is required, at first the induction coil device 20 is activated and heats the well pipe 14 until it is significantly weakened structurally via the heating. This heating step is shown in FIG. 2. Upon sufficient heating and structural weakening of the well pipe 14, a hydraulic piston (not shown) in each of the opposite cylinder housings 32a, 32b is then activated and drives the opposite cutting knives 30a, 30b against each other and through the heated, structurally weakened well pipe 14 until the cutting knives 30a, 30b abut each other and sever the well pipe 14 into said upper part 38 and lower part 40. This cutting step is shown in FIGS. 3 and 7. Then the cutting knives 30a, 30b may be withdrawn toward their respective cylinder housings 32a, 32b, as shown in FIG. 4, and the upper part 38 of the well pipe 14 is pulled out of the bore 12 and the blowout preventer 2. Finally, said shut-off valve (not shown) in the blowout preventer 2 may be closed, thereby closing the blowout preventer 2 completely. During the mechanical severing of the well pipe 14, the induction coil device 20 may become damaged completely or partially. This is shown in FIG. 7. In this embodiment, however, the induction coil device 20 is structured so as to be replaceable (not shown), thereby allowing the induction coil device 20 to be readily removed from the housing 10 for repair or replacement.

The invention claimed is:

1. A safety valve for a well, the safety valve comprising:
a housing having a through-bore through which a tubular object extends;
a shear ram that is configured to mechanically cut completely through the tubular object;
an induction coil device that is disposed adjacent to the shear ram, wherein the induction coil device is directed inwardly towards the through-bore such that operation of the induction coil device heats the tubular object and thereby structurally weakens the tubular object prior to mechanical cutting by the shear ram; and
a pipe ram that is disposed below the induction coil device, wherein the pipe ram is configured to hold the tubular object stationary with respect to the through-bore during heating by the induction coil device and said mechanical cutting by the shear ram;

wherein the pipe ram, induction coil device, and shear ram cooperate to hold the tubular object stationary, heat the tubular object via the induction coil device until the tubular object is structurally weakened, and mechanically cut the tubular object into separate upper and lower parts via the shear ram; and wherein the lower part is held by the pipe ram and the upper part is removable from the safety valve, apart from the lower part.

2. The safety valve according to claim 1, further comprising a shut-off valve on the through-bore above the induction coil device, wherein the shut-off valve shuts off the through-bore upon removal of the upper part from the safety valve.

3. The safety valve according to claim 1, further comprising an electrical power source that supplies electrical power to the shear ram, the induction coil device, and the pipe ram.

4. The safety valve according to claim 1, further comprising heat insulation disposed between the induction coil device and the housing.

5. The safety valve according to claim 1, wherein the induction coil device is radially movable relative to through-bore, thereby allowing for an adjustment of a distance between the induction coil device and the tubular object.

6. The safety valve according to claim 5, further comprising an actuator disposed in the housing, wherein the actuator radially moves the induction coil device relative to the through-bore.

7. The safety valve according to claim 1, wherein the induction coil device is part of a module that is removable from the safety valve.

8. The safety valve according to claim 1, wherein the shear ram comprises opposing cutting knives that are disposed in opposing cylinder housings and that cooperate with each other to completely cut through the tubular object.

9. The safety valve according to claim 8, further comprising an actuator disposed in each of the opposing cylinder housings and configured to actuate the shear ram.

10. The safety valve according to claim 1, wherein the safety valve is part of a blowout preventer.

11. The safety valve according to claim 1, wherein the safety valve is part of a Christmas tree.

12. The safety valve according to claim 1, wherein the tubular object comprises a pipe-string.

13. A method for severing a tubular object in a safety valve for a well, wherein the safety valve comprises a housing having a through-bore through which the tubular object extends, the method comprising:

(A) disposing a shear ram in the housing;
(B) disposing an induction coil device around at least a portion of the through-bore;
(C) operating the induction coil device such that the induction coil device heats and thermally and structurally weakens the tubular object; and
(D) heating the tubular object with the induction coil device until at least one of the following two conditions exist:
  the tubular object melts and is separated into an upper part and a lower part; and
  the tubular object is sufficiently thermally and structurally weakened so that the shear ram can completely sever the tubular object and separate it into an upper part and a lower part.

14. The method according to claim 13, further comprising:
(E) withdrawing the upper part from the safety valve; and
(F) operating a shut-off valve disposed above the induction coil device in the safety valve to shut off the through-bore.

* * * * *